United States Patent
Cvjeticanin et al.

(10) Patent No.: US 7,086,833 B2
(45) Date of Patent: Aug. 8, 2006

(54) HOUSING WITH TWO HOUSING PARTS FOR A RADIAL FLOW COMPRESSOR, AND METHOD FOR MANUFACTURING THE HOUSING

(75) Inventors: Nenad Cvjeticanin, Frankfurt am Main (DE); Uwe Ludwig, Bad Soden-Salmünster (DE)

(73) Assignee: WOCO Industrietechnik GmbH (DE)

( * ) Notice: Subject to any disclaimer, the term of this patent is extended or adjusted under 35 U.S.C. 154(b) by 96 days.

(21) Appl. No.: 10/811,645

(22) Filed: Mar. 29, 2004

(65) Prior Publication Data
US 2004/0223847 A1   Nov. 11, 2004

(30) Foreign Application Priority Data
Mar. 28, 2003   (DE)   ................. 103 14 209

(51) Int. Cl.
*F04D 29/40*   (2006.01)
(52) U.S. Cl. ................. 415/215.1; 415/224.5
(58) Field of Classification Search ............. 415/204, 415/206, 215.1, 213.1, 224.5; 29/888.022, 29/888.024
See application file for complete search history.

(56) References Cited

U.S. PATENT DOCUMENTS 4,867,641 A   *   9/1989   Okuno et al. ............ 415/215.1

FOREIGN PATENT DOCUMENTS

| DE | 27 06 110 | 9/1981 |
|---|---|---|
| DE | 197 20 286 | 11/1998 |
| DE | 101 12 764 | 9/2002 |
| EP | 1 188 544 | 3/2002 |

* cited by examiner

Primary Examiner—Edward K. Look
Assistant Examiner—Dwayne J White
(74) Attorney, Agent, or Firm—Schiff Hardin LLP

(57) ABSTRACT

A housing part, which can be firmly joined to another housing part for the formation of a housing of a radial flow compressor, in particular a turbocharger. At least one open or closed channel portion is provided in each housing part so that when the housing parts are joined a channel system is formed which runs between the two housing parts. A free-flowing and hardening compaction material, such as an adhesive or a thermoplastic polymer, is inserted into the channel system for the formation of a firm bond between the two housing parts.

30 Claims, 3 Drawing Sheets

HOUSING WITH TWO HOUSING PARTS FOR A RADIAL FLOW COMPRESSOR, AND METHOD FOR MANUFACTURING THE HOUSING

BACKGROUND

The invention relates to a housing for a radial flow compressor and a method for manufacturing the housing. The housing may be for a turbocharger, for example.

Radial flow compressors, such as turbochargers, are installed in the region of the intake tract of a motor vehicle, in order to supply the greatest possible quantity of fresh air in the cylinder. In this way air should already be pre-compressed outside of the cylinder. On the basis of the great pressures occurring within the housing of a radial flow compressor the housing is to be constructed sufficiently sturdy.

In addition the charger housings are to be designed fluid tight in order to be able to hold the desired high pressures in the interior of the housing. With regard to the impermeability of such housings frequently single-piece manufactured turbocharger housings are used. Due to the lack of joint gaps single-piece turbochargers are less susceptible with regard to leak formation.

A single-piece turbocharger housing made of thermoplastic polymers is known from DE 101 12 764. With such housings it is a disadvantage that time-consuming die work and subsequent machining are necessary for complicated housing constructions, which causes high manufacturing costs. Under the circumstances, a time-consuming core melting procedure can be used, which in particular in the case of thermosetting plastic materials does not permit sufficiently precise dimensioning of the housing.

An air pump for motor vehicles is known from DE 44 38 750, in which a housing made of plastic with a cover is sealed and closed by means of rotary friction welding. The high temperatures that occur during rotary friction welding, which also cause a plastic deformation of wall regions of the lid touching each other and of the housing, greatly impair the permeability at the welding point and a precise dimensionability of the housing, as a result of which inevitably at least inspections of the dimensions of the housing or even a post-machining must be performed. A lid-housing arrangement also cannot eliminate the difficulties in the manufacturing of complex constructed housing interior surfaces of radial flow compressors.

SUMMARY

It is one object to provide a housing part, a housing for a radial flow compressor and a method for the manufacturing of the housing, whereby the housing to be created can also withstand the high impermeability requirements of such a compressor whereby a simple producibility and a highly-precise dimensioning of the housing is guaranteed.

A housing of radio flow compressor has first and second housing parts firmly connected to one another. A channel system is provided wherein each housing part has at least a portion of the channel system therein such that with the two housing parts joined together, the channel system is formed. A solidified compaction material is provided in the channel system so that the channel system together with the compaction material bond the first and second housing parts to one another.

DESCRIPTION OF THE PREFERRED EMBODIMENTS

Figure 1:
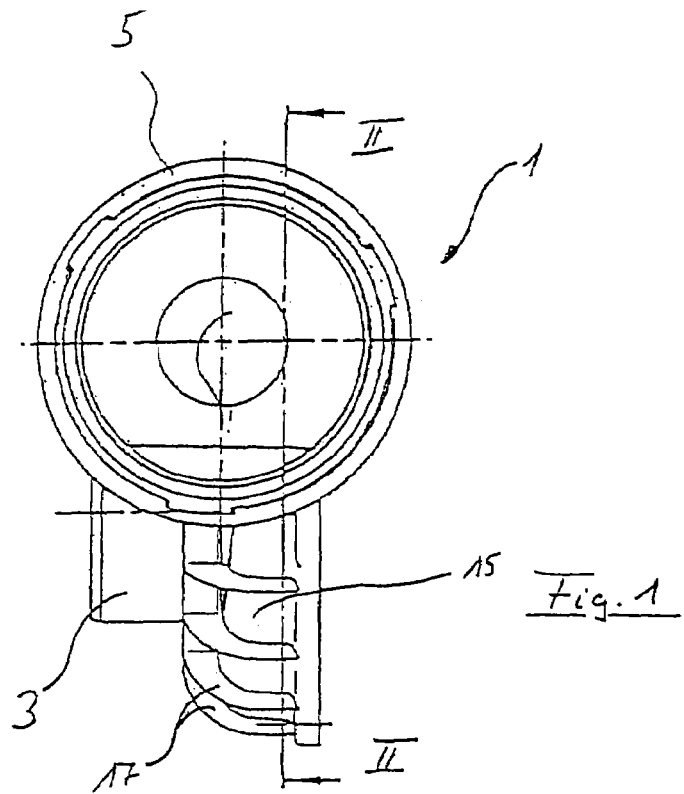
FIG. 1 is a view of the air exhaust opening of the housing of a radial flow compressor.

For the purposes of promoting an understanding of the principles of the invention, reference will now be made to the preferred embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

In accordance with the preferred embodiment, a housing with a channel system is provided. The housing and the channel system are formed by at least two housing parts joined to one another. By means of insertion of a compaction material such as adhesive or thermoplastic polymers, the two housing parts to be joined are connected to one another in a firm bond so that a dimensional change or deformation of the housing does not accompany the connection. The compaction material achieves a certain firmness after insertion on the basis of its shape in the channel system which interlocks the two housing parts. The resulting wedging forces, which are introduced by compaction material into the housing parts, prevent the loosening of the housing parts. For formation of the channel system, each housing part has at least one open or enclosed portion of at least one of the channels of the channel system. The open portions are on the surface to be joined and the enclosed portions run into the surface to be joined so that the resulting channel system meanders between the two housing parts. In the joined state of the two housing parts the complete channel system is formed. Since both housing parts delimit the channel system and thus come into contact with the compaction material, a positive type coupling of the two housing parts is formed. This is reinforced by the fact that the compaction material used generates the adhesive or binding forces against inner surfaces of the channel system.

The open portion of a channel or channels of the channel system at a joining surface of the two housing parts may comprise a groove, that is approximately a half-open channel. In particular, in the case of single-piece design housing parts with open or enclosed channel portions, injection molding methods or pure injection methods are used whereby the corresponding dies are to be provided with projections to create the enclosed portions of a channel or protrusions to create open portions of a channel.

The channels may have different cross-sections and may also have changes in shape to create an interlocking effect as soon as the compaction material fills the channel and achieves the desired solidity for a firm bond.

Preferably, the channel system is designed in regions at the surface of the two connecting parts to be joined. Open channel portions may be provided along the surface to be joined in order to create large coupling regions in this way.

In order to be able to in particular inject the compaction material into the channel system, an opening is to be provided in one of the housing parts. Especially good injection molding results are obtained when an opening is provided in one of the housing parts through which the excess compaction material can flow out. Further ventilation apertures are provided in at least one of the housing parts.

The housing part can exhibit a mold location device in the form of a plate, for example, or a projection or protrusion that is rectangular in cross-section, over which the position of the housing parts to one another in the joining operation of the housing parts is at least in one direction. This mold location device is preferably provided on the surface to be joined, which interacts with the corresponding mold location device from the other housing part. Mold location devices which can set the position in two moving directions can also be provided. A rider/saddle connection may be employed. An especially reliable and strong fastening of the two housing parts is achieved by a channel system which exhibits at least one channel or portion of a channel with a specified curvature. The channel system may comprise a primary or surface channel with additional channels branching off the primary or surface channel, with the branching channels completely dipping into a housing part and then running back into the joining surface to increase the strength of the bond of the two housing parts.

With the exception of the inlet, the outlet and the ventilation apertures and/or vents of the channel system of the housing are self-contained. In a preferred design of the housing for a radial flow compressor, in particular a turbo charger, the housing comprises an air intake pipe, an air outlet pipe, and a compressor duct connecting the two pipes. The two housing parts to be connected form on the one hand the radial exterior section of the compressor duct and on the other hand form the radial interior section of the compressor duct. Preferably the air intake pipe, the air outlet pipe, and the radial exterior section of the compressor duct are manufactured as a single-piece housing part.

Along with the channels for the formation of the channel system, additional chambers may be provided as a part of, or separate from the channel system, and are delimited by walls. These chambers may be formed by respective recesses in the housing parts which can have different cross-sectional forms. These chambers which can be formed by the respective recesses reduce not only the weight of the housing part, but also support dimensional accuracy of the housing.

In a preferred embodiment, the housing parts are injected molded from plastic, in particular thermal-setting plastic.

FIGS. 1 through 6 show the housing 1 of a turbo charger which comprises an air intake pipe 3 and an air outlet pipe 5. The compressor duct 7 connects the air intake pipe to the air outlet pipe. The housing 1 comprises essentially first and second independent housing parts 11, 13, each of which is injection molded from thermal-setting plastic.

The first housing part 11 forms the air intake pipe 3 as well as the air outlet pipe 5 and partially delimits the compressor duct 7, namely by an outer case 15 which is reinforced by ribs 17 molded at a uniform distance to each other. The inner surface 21 of the outer case 15 represents a radial external guide of the air to be compressed in the housing 1.

The second housing part 13 represents the radial internal guide of the compressor duct 7, which is essentially arranged radially inward with respect to the outer case 15.

The fact that the housing is comprised of two pieces 11, 13 is advantageous compared to single-piece models (see DE 101 12 764). This is true since in the single-piece models, the rear cuts existing as a result of the special shape of the compressor duct in a one-piece manufacture of the entire housing, in contrast to the disclosed method, can only be formed with a very high technical production cost.

Figure 4:
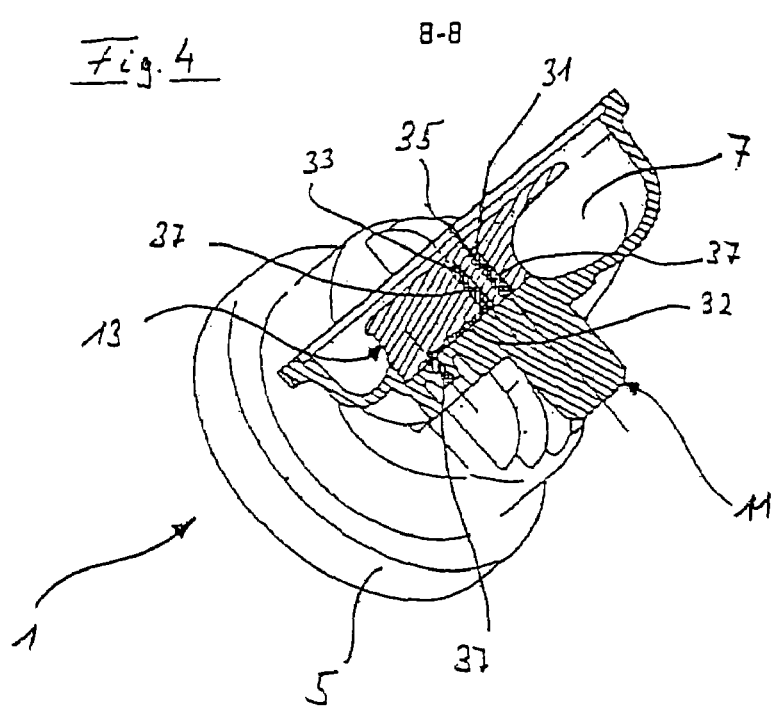
FIG. 4 is a sectional view as per line of intersection IV—IV as per FIG. 3.
Figure 5:
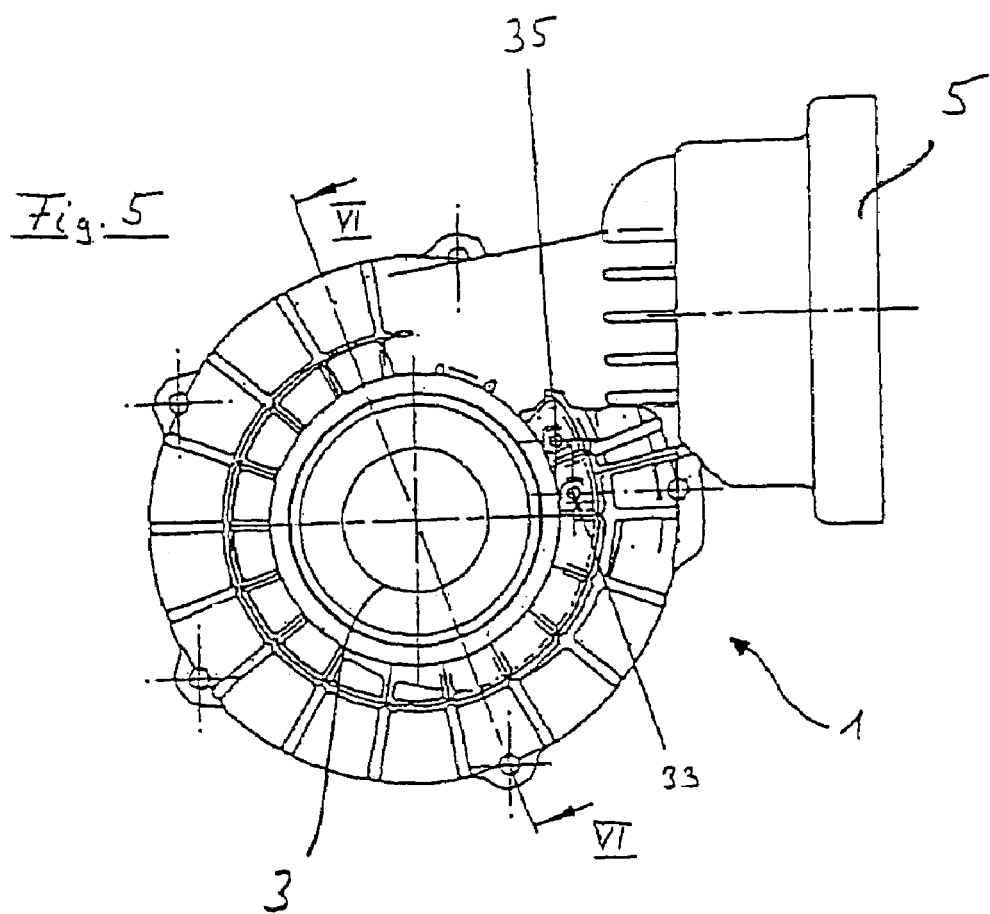
FIG. 5 is a lateral view of the housing as per FIG. 1 of an opposite-lying side.
Figure 6:
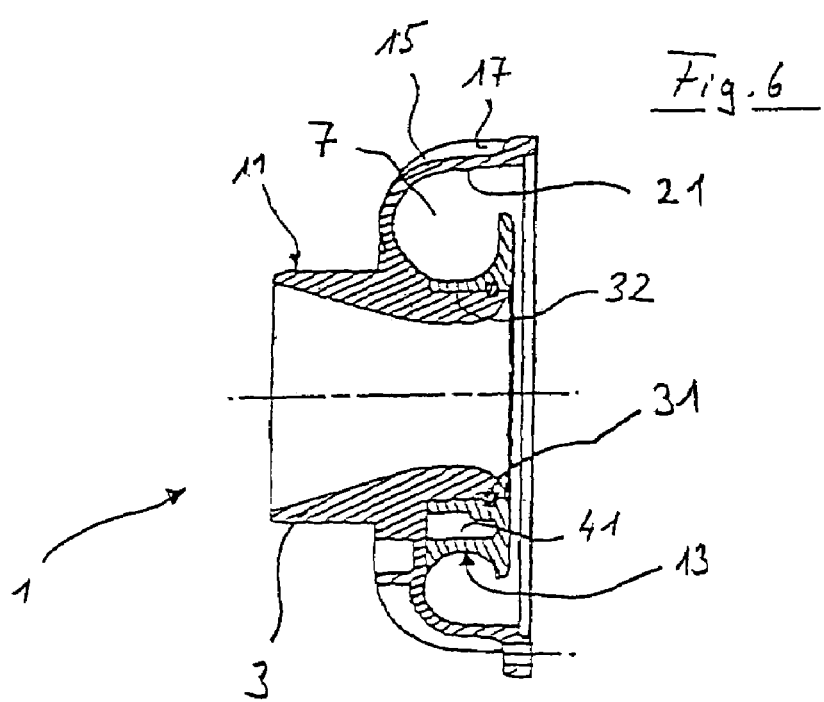
FIG. 6 is a cross-sectional view along the line of intersection VI—VI as per FIG. 5.

To create a tight and precise arrangement of the first and second housing parts 11, 13 to be connected, a labyrinth-like channel system 31 is provided which essentially lies in the transition region with the two housing parts, namely at the surface to be joined—that is the joining surface 32 (see FIGS. 4, 6). The channel system 31 comprises an inlet 33 and an outlet 35 which are hydraulically connected to one another via one or more channel system passages. The channel system is like a labyrinth having meandering channels 37. It is also within the scope of the embodiment to provide a central or surface channel, such as at a surface when the parts join, with branch channels. As is evident in particular in FIGS. 2 and 4, the channel system may run in a radial circumference, concentric to the air intake axis Z along the surface to be joined 32.

At the surfaces 32 to be joined of the housing parts 11, 13, channel portions, that is approximately half-open channels, for example, may be provided so that when the two housing parts are joined to each other, an enclosed channel results. These open channel portions may extend concentrically around the air intake axis Z. Enclosed channels 37 are provided vertical to the surface to be joined which are part of the overall channel system 36. The channels can have different cross-section. In particular, a channel 37 can have a cross-section that changes in its shape.

The labyrinth-like channel system 31 is delimited both by the first housing part 11 as well as by the second housing part 13. Portions of the channel system can partially run exclusively through one of the two housing parts 11, 13. In the process, a channel or channels of the labyrinth-like channel system, viewed from one housing part, can run completely in the first housing part 11, emerge out of the first housing part 11 at the surface to be joined, and after a specified distance disappear completely in the second housing part 13, and then return to the first housing part 11. Hence, a compaction material placed in the labyrinth-like channel system winds from one housing part to the other, and as a result forms a kind of meshed mounting support.

For a firm bond of the two housing parts 11, 13, a compaction material is free-flowing when injected into the channel system 31 via the inlet 33 in order to fill the channel system 31 completely. Advantageously, a thixotropic adhesive or a thermoplastic polymer is used. After the compaction material has hardened and set, thus achieving a rigid connection between the two housing parts, the rigid compaction material has back injected portions which cause a kind of interlacing of the two housing parts by means of the solid compaction material extending in the channel system. In other words, the mass placed in the channel system causes an interlocking of the two housing parts 11, 13 so that the housing parts can no longer be displaced relative to one another.

Figure 2:
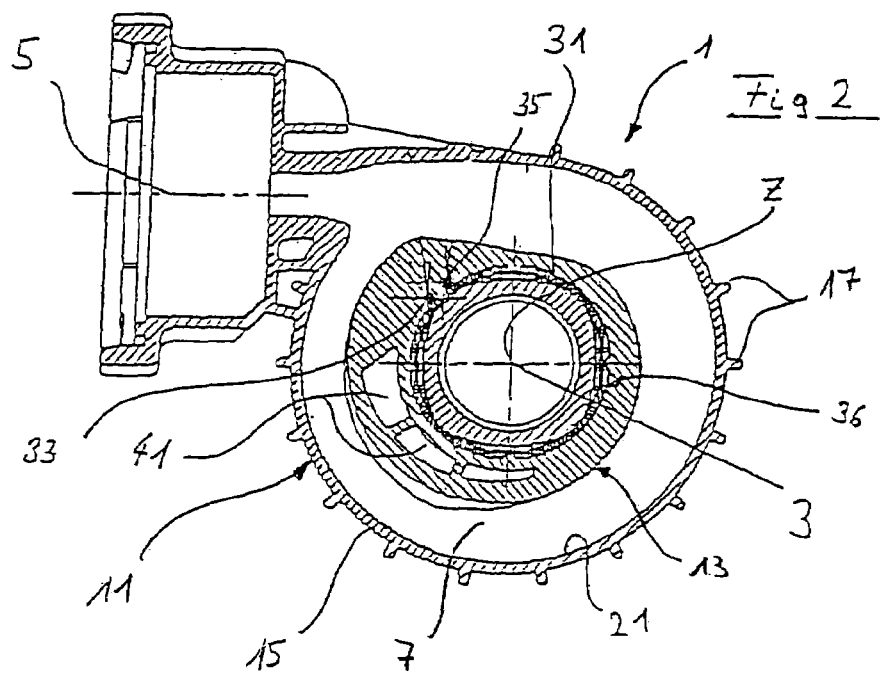
FIG. 2 is a cross-sectional view along the line of intersection II—II as per FIG. 1.
Figure 3:
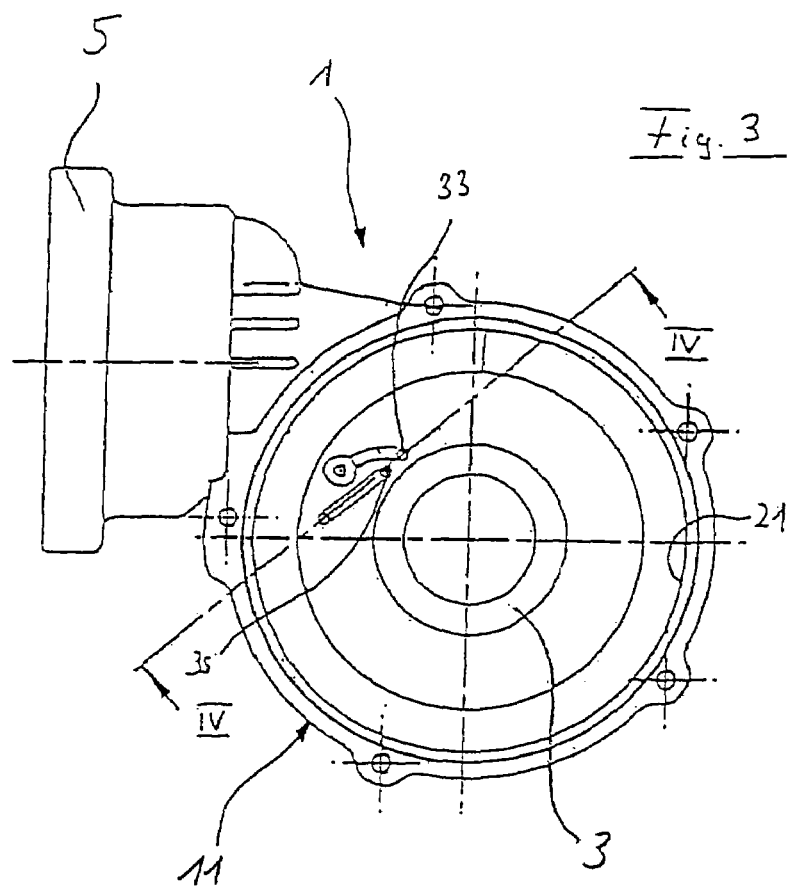
FIG. 3 is a lateral view of the housing as per FIG. 1.

As is evident in particular in FIGS. 2 and 6, the second housing part 13 may also comprise a recess 14 forming chambers which are separated by partitions and extend substantially concentrically around the air intake axis Z. In this way, the weight of the second housing part 13 can be reduced. Such chambers can be part, or separate from, of the channel system if desired.

To achieve a uniform and pocket-free distribution of the compaction material, the channel system may also comprise ventilation apertures and/or vents which are not shown in greater detail in the drawings.

The features disclosed in the preceding description, the Figures, and the claims are significant both individually and also in any combination for the realization of the enclosed embodiment in the different designs.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

We claim as our invention:

1. A housing of a radial flow compressor, comprising:
   first and second plastic housing parts;
   a channel system comprising at least one channel;
   each housing part having at least a portion of at least one channel of the channel system such that with the two housing parts joined together the channel system is formed; and
   a compaction material which is free-flowing when injected into the channel system being provided in the channel system so that the channel system together with the compaction material formed therein forms a firm bond of the first and second plastic housing parts to one another.

2. A housing according to claim 1 wherein said at least one channel portion comprises an enclosed channel portion.

3. A housing according to claim 1 wherein at least one channel portion of a channel system meanders between the first and second housing parts.

4. A housing according to claim 1 wherein the channel system is like a labyrinth.

5. The housing according to claim 1 wherein the at least one channel portion comprises a groove.

6. A housing according to claim 1 wherein the at least one channel portion comprises approximately half of an enclosed channel.

7. A housing according to claim 1 wherein the at least one channel portion comprises an enclosed channel portion which runs to a joining surface between the two housing parts.

8. A housing according to claim 1 wherein said at least one channel portion comprises an open channel portion which runs along a joining surface of the respective housing part.

9. A housing according to claim 1 wherein the channel system has an inlet for receiving the free-flowing compaction material during injection.

10. A housing according to claim 1 wherein an outlet is provided for said channel system permitting at least one of removal of excess compaction material and ventilation of the channel system.

11. A housing according to claim 1 wherein the housing has ventilation apertures.

12. A housing according to claim 1 wherein a mold location device is provided which determines position so the first and second housing parts in their joined state have at most one degree of freedom of motion.

13. A housing according to claim 1 wherein the first and second housing parts comprise a thermoplastic setting plastic material.

14. A housing according to claim 1 wherein the channel system further comprises at least one chamber.

15. A system according to claim 14 wherein the chamber is formed by a material recess in each of the respective housing parts so that when the housing are joined the chamber is formed.

16. A system according to claim 14 wherein the chamber lies entirely within one of the housing parts.

17. A housing according to claim 1 wherein different parts of the channel system have different cross-sections.

18. A housing according to claim 1 wherein the housing comprises a turbocharger housing.

19. The housing according to claim 1 wherein an air intake pipe, an air outlet pipe, and a compressor duct are provided, the duct connecting the air intake pipe and the air outlet pipe, and wherein the second housing part forms at least one radial interior section of the compressor duct and the first housing part forms at least one radial exterior section of the compressor duct.

20. The housing according to claim 19 wherein the air intake pipe, air outlet pipe, and the radial exterior section of the compressor duct are manufactured as the first single-piece housing part.

21. A housing according to claim 19 wherein the radial interior section has at least one recess for receiving compaction material which is mateable with a corresponding recess in the other housing part to form a chamber.

22. A housing according to claim 21 wherein the chamber is independent of the channel system.

23. A housing according to claim 21 wherein the chamber is part of the channel system.

24. A housing according to claim 21 wherein a plurality of said material recesses for forming respective chambers are provided.

25. A housing according to claim 24 wherein the plurality of chambers have different cross-sections.

26. A housing of a radial flow compressor, comprising:
   first and second housing parts;
   a channel system comprising at least one channel;
   each housing part having at least a portion of at least one channel of the channel system such that with the two housing parts joined together the channel system is formed;
   a compaction material which is free-flowing when injected into the channel system being provided in the channel system so that the channel system together with the compaction material formed therein forms a firm bond of the first and second housing parts to one another; and
   wherein said compaction material comprises an adhesive or a thermoplastic polymer.

27. A housing of a radial flow compressor, comprising:
   first and second housing parts;
   a channel system comprising at least one channel;
   each housing part having at least a portion of at least one channel of the channel system such that with the two housing parts joined together the channel system is formed;
   a compaction material which is free-flowing when injected into the channel system being provided in the channel system so that the channel system together with the compaction material formed therein forms a firm bond of the first and second housing parts to one another; and
   wherein said at least one portion of at least one channel of the channel system comprises an open channel portion which mates with a corresponding open channel portion of the other housing part to form an enclosed channel portion with the two housing parts connected together.

28. A housing of a flow compressor, comprising:

first and second plastic housing parts;

a channel system;

each housing part having at least a portion of the channel system therein with the two housing parts joined together by the channel system; and a solidified compaction material being provided in the channel system so that the channel system together with the compaction material bond the first and second plastic housing parts to one another.

29. A method for manufacturing a housing of a radial flow compressor, comprising the steps of:

providing first and second housing parts, each housing part having at least a portion of at least one channel of a channel system to be formed when the two housing parts are joined together; and holding the two housing parts together and injecting a free-flowing compaction material into the channel system so that the channel system together with the compaction material formed therein forms a firm bond of the first and second housing parts to one another when the compaction material solidifies.

30. A method of claim 29 including the step of providing the channel system with at least one portion which has a path which meanders between the first and second housing parts.

* * * * *